(12) United States Patent
Bauer et al.

(10) Patent No.: US 7,219,779 B2
(45) Date of Patent: *May 22, 2007

(54) HYDRO-PNEUMATIC SUSPENSION SYSTEM

(75) Inventors: Wolfgang Bauer, Dürkheim (DE); Heinz Schwegler, Neulussheim (DE)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/911,891

(22) Filed: Aug. 5, 2004

(65) Prior Publication Data

US 2005/0067239 A1    Mar. 31, 2005

(30) Foreign Application Priority Data

Aug. 16, 2003   (DE) .............................. 103 37 601

(51) Int. Cl.
*F16D 57/00*    (2006.01)
(52) U.S. Cl. ................. 188/266; 267/64.16; 280/6.159
(58) Field of Classification Search ................ 188/266, 188/319.1, 300; 267/64.12, 64.16, 64.28; 280/5.504, 5.515, 5.519, 6.157, 6.159, 124.158, 280/124.159, 754, FOR. 165, FOR. 168
See application file for complete search history.

(56) References Cited

U.S. PATENT DOCUMENTS

| | | | | |
|---|---|---|---|---|
| 3,913,938 A | * | 10/1975 | Aikawa et al. .......... | 280/6.158 |
| 5,338,010 A | * | 8/1994 | Haupt ...................... | 267/64.16 |
| 5,601,306 A | * | 2/1997 | Heyring ................... | 280/5.508 |
| 6,009,708 A | * | 1/2000 | Miki et al. ............... | 60/414 |
| 6,145,859 A | * | 11/2000 | Altherr et al. ........ | 280/124.159 |
| 6,786,492 B2 | * | 9/2004 | Brandenburger ......... | 280/5.519 |
| 2005/0258607 A1 | | 11/2005 | Brandenburger ......... | 280/5.519 |

FOREIGN PATENT DOCUMENTS

| DE | 42 21 126 C2 | 8/1994 |
|---|---|---|
| DE | 101 07 631 A1 | 9/2002 |

* cited by examiner

*Primary Examiner*—Pam Rodriguez

(57) ABSTRACT

A hydro-pneumatic suspension system includes one or more hydraulic suspension cylinders mounted between the vehicle body and the axle. Each cylinder includes a piston chamber and rod chamber, each of which are connected to an accumulator and which can be connected to a pressure source and a tank by valve systems. The valve system for the rod chamber includes a first solenoid valve and a hydraulically and electrically actuated proportional pressure adjusting valve. The proportional valve is exposed to rod chamber pressure and to tank pressure. The rod chamber pressure can be applied on the proportional valve either directly as control pressure or can be detected with a sensor, and can be used to control the proportional valve. Such a system can influence the dependency of the suspension stiffness on the axle load and can be used to adjust the stiffness to ballast conditions and operating or driving states.

21 Claims, 2 Drawing Sheets

HYDRO-PNEUMATIC SUSPENSION SYSTEM

BACKGROUND

The present invention relates to a hydro-pneumatic suspension system for use in a wheel or axle suspension of a motor vehicle, such as a farm or industrial vehicle.

Such a suspension system includes at last one hydraulic suspension cylinder connected between the vehicle body and the wheel and/or vehicle axle. The cylinder has a piston chamber and rod chamber, each connected to at least one accumulator. Valve systems can controllably connect the piston chamber and rod chamber to a pressure source and to a tank. Such a suspension system can be a single-wheel suspension or an axle suspension.

The design of a hydro-pneumatic suspension system is a particular challenge especially for farm or industrial equipment, such as tractors, because a wide range of wheel or axle loads are possible. The axle load range usually exceeds the pressure ratio possible with diaphragm/membrane type accumulators. In order to be able to adhere to the operating range of the accumulator, the system is therefore pre-loaded. This pre-load acts like an additional axle load, thus allowing a decrease in the ratio between minimal and maximum axle load.

The system is rarely pre-loaded by means of mechanical pre-stressing, during which process also a single-acting cylinder can be used. Generally a double-acting hydraulic cylinder is employed, which allows the rod chamber side to be pre-loaded to a specific pressure via an accumulator.

The pressure in the rod chamber can either correspond to the maximum system pressure as described in published German patent application DE 43 08 460, or the pressure can be adjusted by means of a pressure regulator to a specific pre-selected value as described in German patent DE 42 42 448. In both methods, as is the case with any hydro-pneumatic system, the spring rate essentially has a quadratic dependency on the axle load in accordance with a given function. For a consistent natural frequency of the tractor body mass in combination with the suspension system, however, a linear function would be ideal.

Published German patent applications DE 197 19 076 and DE 197 19 077 describe systems which include a hydraulically actuated pressure control valve in the line leading to the rod chamber, and the control valve spring regulating force is adjusted as a function of the pressure in the line leading to the piston chamber. Thus, the pressure in the rod chamber is supposed to be regulated as a function of the pressure in the piston chamber of the hydraulic cylinder, wherein the additional load in the rod chamber is greatest at low load levels and is reduced at higher load levels down to a minimum value. This is intended to improve, among other things, the driving comfort.

Published German patent application DE 41 20 758 describes a hydro-pneumatic vehicle suspension system of the above-mentioned kind in which, a hydraulically actuated control valve is arranged in the feed line to the rod chamber for the purpose of adjusting to a large range of axle load. The control valve is subjected to the pressure in the rod chamber and to the pressure of the piston chamber so that the pressure in the rod chamber is regulated as a function of the pressure in the piston chamber. This is intended to provide a greater stiffness spring in the smaller axle load range.

Different ballast conditions on the vehicle can lead to the same axle load. For example, in order to compensate the weight of a heavy plow and apply sufficient load onto the front axle, ballast weights can be mounted on the front of the tractor. This ballast balancing can result in the same axle load on the front axle, such as on a tractor that is equipped neither with a plow nor with front weights. In the known vehicle suspension systems, however, the rigidity cannot react to different ballast conditions and operating or driving states of the vehicle—the rigidity is not dependent on these conditions and solely depends on the respectively present axle load. This can result, when there is a lot of ballast, in a tractor suspension which is too soft with respect to the characteristic pitch frequency, and, when there is no ballast, in a tractor suspension which is too stiff.

SUMMARY

Accordingly, an object of this invention is to provide a hydro-pneumatic suspension system with a stiffness which can be controlled or adjusted as a function of ballast conditions and operating or driving states of the vehicle and which is not dependent solely on the axle load.

This and other objects are achieved by the present invention, wherein a hydro-pneumatic suspension system includes at least one double-acting hydraulic suspension cylinders mounted between the chassis of a vehicle and its wheel and/or axle. Each cylinder has a cylinder or piston chamber and a rod chamber, each connected to an accumulator. A valve system independently controls communication between the piston chambers, the rod chambers, a pressure source and a tank. A rod chamber valve includes a low leakage first solenoid valve, which is closed in an unenergized position, and an electrically actuatable proportional pressure adjustment valve in series with the solenoid valve.

The rod chamber pressure can preferably be applied directly to the proportional valve as a control pressure or it can be detected by using a sensor and be used to control the proportional valve. In a preferred embodiment of the invention, a pressure sensor senses the rod chamber pressure and/or a force sensor senses the axle load. The proportional valve is controlled in response to sensor signals from these sensors. Alternatively or in addition, it is particularly beneficial to actuate the proportional valve hydraulically as a function of the rod chamber pressure. The proportional valve is thereby exposed to rod chamber pressure and to tank pressure.

The solenoid valve is preferably connected between the rod chamber and the proportional valve. In its closed position it prevents leakage from the rod chamber to the tank. In its closed position, a check valve is active. Suitable solenoid valves with extremely low leakage are commercially available, such as the SV08-20 and SV08-22 models manufactured by HydraForce, Lincolnshire, Ill., USA.

The rod chamber pressure is adjusted by the proportional valve. A certain pressure can be pre-selected via the control current of the magnet controlling the proportional valve, and the rod chamber pressure is then adjusted to the pre-selected pressure. The control current can be adjusted by a control unit as a function of different parameters, such as ballast, driving speed and working conditions. If the suspension system also includes a level control device with a position transmitter, the control unit can also respond to signals from the position transmitter which can represent the magnitude of jolts or shocks transmitted from the ground to the tires.

This suspension system allows the rod chamber pre-load of the primary suspension to be modified within a broad range. In particular, the rod chamber, and hence the suspen sion characteristic, can be adjusted in a wide range within given physical limits so that on one hand a stronger than a quadratic dependency—a superproportional or an "overproportional" dependency—of the stiffness on the axle load can be dealt with, and e.g. a more linear suspension characteristic can be adjusted. On the other hand, the suspension system can also react to different ballast conditions, speeds and working conditions of the vehicle through a suitable electrical actuation of the proportional valve. The suspension characteristics can therefore be individually adjusted to different driving and operating uses, automatically and in an optimal fashion. It should be emphasized that for the actuation of the proportional valve, no pressure sensor signal detected by the control unit is required, even if in special applications the use of a pressure sensor signal can be useful.

The first solenoid valve preferably includes a closed shut-off un-energized position wherein it prevents fluid from flowing out of the rod chamber. Preferably, the first solenoid valve has a shut-off position wherein it prevents fluid from flowing through in both directions.

A flow restriction limits the flow between the first solenoid valve and the proportional valve and enables a controlled adjustment of the rod chamber pressure. It is also possible to adjust the rod chamber pressure in a controlled fashion by slowly adjusting the proportional valve and eliminate the flow restriction. A flow restriction may still be beneficial in connection with a load sensing control arrangement. The flow resistance may be a local narrowing area (orifice) or a constriction extending over a longer flow path, such as a throttle.

Preferably, the proportional valve is an electromagnetically controlled proportional pressure control valve, which controls communication between the rod chamber, the tank and the pressure source. Suitable proportional pressure control valves are sold, for example, as the TS98-31 model by HydraForce, Lincolnshire, Ill., USA.

Preferably, the proportional pressure control valve has an un-energized position wherein it communicates the rod chamber to the tank, and an energized position wherein it communicates the pressure source to the rod chamber. The proportional pressure control valve includes a return spring which urges the proportional pressure control valve to its un-energized position.

Preferably, the rod chamber pressure acts upon a control element or spool of the proportional pressure control valve in the same direction as the force of the return spring, and the tank pressure acts upon the spool in the same direction as the electromagnetic force. Thus, increasing pressure on the rod chamber side causes the proportional pressure control to connect the rod chamber to the tank, whereby the tank pressure serves as a reference counterpressure.

Alternatively, an electromagnetically controlled proportional pressure limiting valve may be used instead of the proportional pressure control valve. Such a valve optionally establishes a connection between its rod chamber side port and the tank. Suitable proportional pressure limiting valves are available, for example, as the TS08-27 model made by HydraForce, Lincolnshire, Ill., USA.

The proportional pressure limiting valve has an energized position wherein it communicates its rod chamber side port to its tank-side port, and has an un-energized position wherein it blocks this communication. The proportional pressure limiting valve preferably includes a return spring which urges it to its blocking position.

When using a proportional pressure limiting valve it is especially beneficial that the tank-side pressure acts upon the control element or spool of the proportional pressure control valve in the same direction as the force of the return spring, and that the rod chamber side pressure acts upon the spool in the same direction as the electromagnetic force. Thus, in response to increasing pressure on the rod chamber side, the proportional pressure control valve tends to connect said side to the tank, whereby the tank pressure serves as a reference counterpressure.

The proportional pressure limiting valve controls only the communication between the rod chamber side and the tank. In order to be able to apply also pressure from the pressure source to the rod chamber side it is particularly beneficial if a pressure line that is connected to the pressure source branches off the line running between the solenoid valve and the proportional pressure limiting valve.

A pressure line flow restriction in the pressure line limits the pressure on the rod chamber side to a desired value. This enables a steady, limited fluid flow from the pressure source to the rod chamber side. However, the proportional pressure limiting valve limits the pressure on the rod chamber side because it opens when an electronically regulated rod chamber side pressure is exceeded.

A second solenoid valve can be arranged in the pressure line, in addition or alternatively to the pressure line flow restriction. The second solenoid valve preferably includes a closed or non-return position which prevents fluid from flowing in from the pressure source so that little or no leakage occurs from the pressure source to the rod chamber side. If a proportional valve is used as the solenoid valve, the pressure line flow restriction can be eliminated.

The pressure source is preferably a hydraulic pump, such as a hydraulic pump that is already available for other hydraulic parts of the vehicle. The pump may include a load sensing function, in which the required system pressure is used to actuate the pump. Such a hydraulic pump requires hydraulic fluid only upon demand and otherwise assumes a low-power standby operational state.

DETAILED DESCRIPTION

Figure 1:
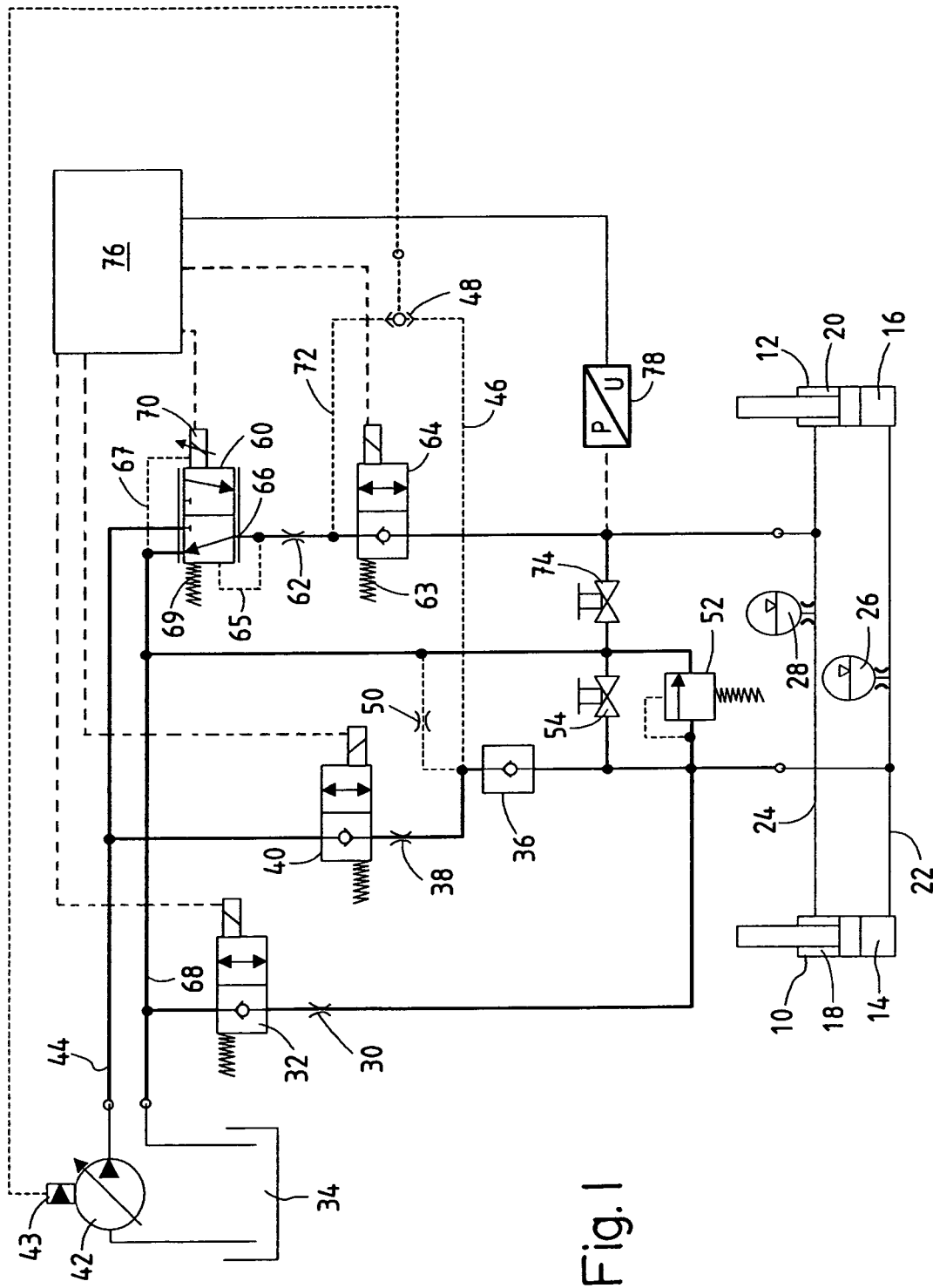
FIG. 1 is a hydraulic circuit diagram of a hydro-pneumatic vehicle suspension with a first suspension system pursuant to the invention.

The vehicle suspension system of FIG. 1 is for the suspension of a steerable, pendulous tractor front axle (not shown). The system includes two cylinders 10, 12. The two piston chambers 14, 16 of the hydraulic cylinders 10, 12 and the two rod chambers 18, 20 of the two hydraulic cylinders 10, 12 are connected by hydraulic lines 22, 24 to each other and to a corresponding hydraulic accumulator 26, 28.

The piston chamber hydraulic line 22 is connected via a first flow restriction 30 and a first low leakage switching valve 32 to a fluid reservoir or tank 34. In response to electric signals, the first switching valve 32 can switch between a flow position and a blocking position, ensuring that no fluid can unintentionally escape from the piston chamber side of the suspension circuit to the tank 34. The hydraulic line 22 on the piston chamber side is moreover connected via a non-return valve 36, a second flow restriction 38 and a second low leakage switching valve 40 to a pressure source, which is a controlled load sensing pump 42.

The second switching valve 40 can be switched in response to electric signals between a flow position and a blocking position, ensuring that no fluid can unintentionally flow from the hydraulic pump 42 to the suspension circuit. The non-return valve 36 blocks the fluid flow in the opposite way as the second switching valve 40 in order to prevent leakage when the pressure in the piston chamber side is greater than the pressure in the supply line 44.

This valve arrangement serves level control purposes. To reduce the level position the first switching valve 32 is energized, its spool switches into the "open" position and hydraulic fluid flows from the piston chamber side hydraulic line 22 in a controlled fashion via the first flow restriction 30 to the tank 34. In order to adjust the axle upward, the second switching valve 40 is opened and fluid flows initially from the supply line 44 via the second flow restriction 38 into a load sensing line 46 and reports the demand for pressure to the control port 43 of the hydraulic pump 42 via a shuttle valve 48. Pump 42 increases the pressure until the non-return valve 36 opens and fluid flows into the piston chamber side hydraulic line 22. The second flow restriction 38 on one hand limits the volume flow, but on the other hand also generates a pressure drop so that the pressure in the piston chamber side is always reported to the load sensing system. This prevents the pump 42 from adjusting to a maximum flow condition, but the pump 42 always provides a pressure that is for example, 30 bar above the piston chamber pressure level. Parallel to this a volume flow also always flows via a third flow restriction 50 back to the tank 34 in the case of an open second switching valve 40. This additional cross-section provided by the third flow restriction 50 is required in order to relieve the load sensing pressure toward the tank 34 in the case of a closed second switching valve 40.

It should be emphasized that instead of the first switching valve 32 and the first flow restriction 30 or the second switching valve 40 and the second flow restriction 38, alternatively a proportionally controlled, low leakage 2 position/2-way valve can be used, which can be opened by a specific amount under current control.

The pressure in the piston chamber side of the suspension circuit, namely the hydraulic line 22, is limited by a pressure limiting valve 52 to a certain maximum pressure, which is usually determined by the accumulators. A drain valve 54 relieves pressure from the piston chamber side in case service is required.

The rod chamber pressure can be adjusted by this suspension system. As shown in FIG. 1, the suspension system includes an electrically adjustable proportional pressure control valve 60, a flow restriction 62 and an electrically switchable solenoid valve 64, connected in series. The solenoid valve 64 is connected to the rod chamber line 24 and the proportional pressure control valve 60 enables an optional connection to the pump 42 or to the tank 34. The spool of the proportional pressure control valve 60 is exposed on one hand via a control line 65 to the pressure of its rod chamber port 66, and on the other hand via a control line 67 to the pressure of the tank line 68, specifically such that the rod chamber side pressure counteracts the force of the solenoid 70 jointly with the force of a return spring 69.

When energized the solenoid valve 64 opens a flow opening against the force of a return spring 63, and when de-energized said opening is closed such that a fluid outflow from the rod chamber side hydraulic line 24 is prevented reliably. The solenoid valve 64 is for example a low leakage 2-position/2-way valve. However it can also be an electromagnetically controlled proportional valve, wherein the flow restriction 62 may be eliminated.

Between the solenoid valve 64 and the flow restriction 62 a load sensing line 72 branches off, which is connected to the shuttle valve 48. The shuttle valve 48 conducts the greater one of the pressures of the two load sensing lines 46 and 72 on to the pump 42.

It is possible to pre-select a certain fluid pressure, which is then adjusted in the rod chamber side hydraulic line 24, via the control current of the solenoid 70. The low leakage solenoid valve 64 ensures that with a shut-off proportional pressure control valve 60 as little leakage as possible occurs from the rod chamber side of the suspension circuit to the tank 34. Since the proportional pressure control valve 60 connects the rod chambers to the tank 34 in a non-energized state, the closed solenoid valve 64 also makes it possible to decrease the load sensing pressure towards the tank 34 via the proportional pressure control valve 60 without fluid flowing out of the rod chamber side hydraulic line 24. The rod chamber pressure is controlled by the flow restriction 62 as well as possibly by slowly adjusting the proportional pressure control valve 60 (in the latter case it could be possible to eliminate the flow restriction). Here as well, the elimination of the load sensing pressure behind the flow restriction 62 (i.e. between the flow restriction 62 and the solenoid valve 64) ensures that the pump 42 is adjusted to provide only to a pressure of 30 bar above the rod chamber pressure level. A drain valve 74 is used to relieve pressure from the rod chamber.

Instead of solenoid valve 64 it is also possible to use a pilot opened check valve. For example, the pressure from the piston side control circuit (e.g. line 46) can be connected to its pilot line, causing the check valve to open every time the solenoid valve 40 opens.

The two switching valves 32, 40, the proportional pressure control valve 60 and the solenoid valve 64 are controlled and actuated by an electric control unit 76. The control unit 76 receives signals from a position sensor (not shown), which are used for level control purposes by means of the switching valves 32, 40. For adjusting the rod chamber side pressure by means of the proportional pressure control valve 60, the control unit 76 also receives signals from a vehicle speed sensor (not shown) and a tractive force sensor (not shown). The stiffness can thus be adjusted automatically as a function of the vehicle speed and/or as a function of whether a device is attached to or mounted on the vehicle, which can be determined from the draft force sensor signal. The control unit 76 can, if useful, also receive and evaluate the signals of a rear and/or front power take-off shaft (not shown) or other vehicle sub-assemblies (not shown). The ballast state of the vehicle can be specified for example based on a switch through an operator. It is likewise detected by the control unit and evaluated for the purpose of adjusting the proportional pressure control valve 60. The aforementioned and additional signals can be made available to the control unit 76 for example via a CAN bus (not shown).

A pressure sensor 78 is connected to the rod chamber hydraulic line 24, the signals of which are evaluated by the control unit 76 and used to adjust the proportional pressure control valve 60. When using the pressure sensor 78 it is also possible to use a proportional pressure control valve that is actuated in a purely electric (not hydraulic) fashion so that both control lines 65 and 67 in FIG. 1 are eliminated.

Figure 2:
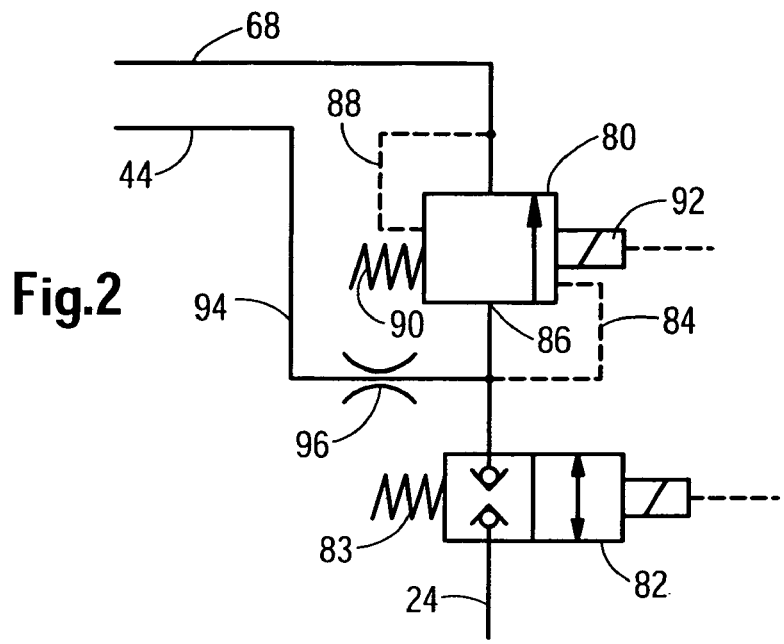
FIG. 2 is a hydraulic circuit diagram of an alternative second suspension system pursuant to the invention.

FIG. 2 shows an alternative suspension system. Instead of the proportional pressure control valve 60 shown in FIG. 1, the system of FIG. 2 includes an electrically switchable proportional pressure limiting valve 80 in series with a solenoid valve 82 and which connects the rod chamber side hydraulic line 24 to the tank line 68. The proportional pressure limiting valve 80 is located on the side of the tank line 68 and the switching valve 82 on the side of the rod chamber side hydraulic line 24.

The proportional pressure limiting valve 80 has a spool which exposed via a control line 84 to the pressure of its rod chamber side port 86, and which is exposed via a control line 88 to the pressure of the tank line 68, so that the rod chamber pressure acts against the force of a return spring 90 in the same direction as the force of the solenoid 92. The solenoid valve 82 is energized to open against the force of the return spring 83, and is closed when not energized so that a fluid outflow from the rod chamber hydraulic line 24 as well as a fluid flow in the opposite direction are prevented reliably. Between the solenoid valve 82 and the proportional pressure limiting valve 80, a pressure line 94 branches off and is connected to the supply line. Pressure line 94 includes a flow restriction 96. The two valves 80, 82 shown in FIG. 2 are controlled in accordance with FIG. 1 by a control unit 76.

A certain fluid pressure, which is then adjusted in the rod chamber side hydraulic line 24 (rod chamber side of the suspension circuit), can be pre-selected by means of the control current of the solenoid 92 of the proportional pressure limiting valve 80. The low leakage bidirectional poppet type solenoid valve 82 ensures that as little leakage as possible occurs from the rod chamber side of the suspension circuit to the tank 34 and vice versa from the supply line 44 to the rod chamber side of the suspension circuit, when proportional pressure limiting valve 80 is shut-off. When the proportional pressure limiting valve 80 is closed, its port 86 is subjected to the pump pressure. When it opens, the pump pressure that is present at port 86 is decreased towards the tank 34 via the tank line 68. The pressure line flow restriction 96 hereby restricts the fluid inflow from the pump 42 so that the pressure at port 86 decreases in accordance with the level to which the proportional pressure limiting valve 80 is opened. With an opened solenoid valve 82, the pressure in the rod chamber side hydraulic line 24 can thus be adjusted to a desired value.

Figure 3:
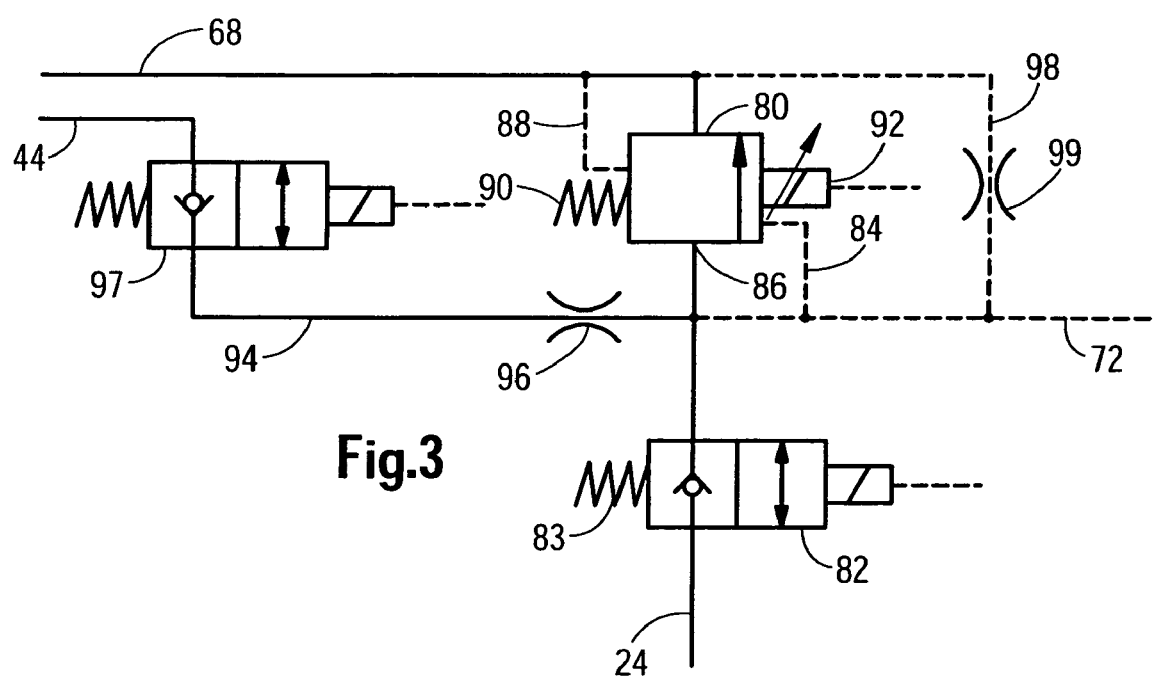
FIG. 3 is a hydraulic circuit diagram of a third alternate suspension system pursuant to the invention.

FIG. 3 shows another modified embodiment of the suspension system. In FIGS. 2 and 3 equivalent components were assigned the same reference numbers. The suspension system illustrated in FIG. 3 provides a load sensing signal.

The system of FIG. 3 includes in the pressure line 94 the aforementioned pressure line flow restriction 96, and in addition a second solenoid valve 97 in series therewith. However, the function of the flow restriction 96 may be integrated into the solenoid valve 97 (proportional actuation). The second solenoid valve 97 has a closed position which prevents a fluid inflow from the pressure source 42. Moreover, port 86 is connected to the tank line 68 by a control line 98, which contains a flow restriction 99.

The second solenoid valve 97 allows the fluid flow coming from the pump 42 to be interrupted so that with a closed proportional pressure limiting valve 80 the pump pressure is no longer present at port 86. It is rather decreased towards the tank pressure via the throttled control line 98. Hence, the pressure at port 86 can be used as a load sensing pressure and is for this purpose connected to the load sensing line 72 (shown in more detail in FIG. 1).

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A hydro-pneumatic suspension system having at least one hydraulic suspension cylinder, the cylinder having a piston chamber and a rod chamber each connected to at least one accumulator and valve systems for controlling communication between said chambers and a pressure source and a tank, characterized by:
   a rod chamber valve system for controlling communication between the rod chamber and the pressure source and the tank, the rod chamber valve system comprises a first solenoid valve, an electrically controlled proportional valve for adjusting the pressure in the rod chamber, and a pressure sensor for sensing the pressure in the rod chamber, the proportional valve being controlled as a function of a signal from said pressure sensor.

2. The suspension system of claim 1, wherein:
the proportional valve is responsive to pressure of the rod chamber and to tank pressure.

3. The suspension system of claim 1, wherein:
the first solenoid valve includes a check valve function in a closed position which prevents a fluid outflow from the rod chamber.

4. The suspension system of claim 1, wherein:
the first solenoid valve includes a bi-directional check valve function in a closed position which prevents fluid through-flow in both directions.

5. The suspension system of claim 1, further comprising:
a flow limiting flow restriction connected between the first solenoid valve and the proportional valve.

6. The suspension system of claim 1, wherein:
the proportional valve is an electromagnetically controlled proportional pressure control valve.

7. The suspension system of claim 6, wherein:
the proportional pressure control valve has a un-energized tank position wherein it connects a rod chamber port to a tank port, and an energized position wherein it connects a pressure source port to the rod chamber port.

8. The suspension system of claim 7, wherein:
a return spring is biased to urge the proportional pressure control valve to the tank position.

9. The suspension system of claim 8, wherein:
rod chamber pressure acts upon the proportional pressure control valve in a same direction as a force of the return spring, and tank pressure acts upon the proportional pressure control valve in a same direction as an electromagnetic force.

10. The suspension system of claim 1, wherein:
the proportional valve is an electromagnetically controlled proportional pressure limiting valve.

11. The suspension system of claim 10, wherein:
the proportional pressure limiting valve includes an energized position wherein it connects a rod chamber port to a tank port and an un-energized position blocking said connection.

12. The suspension system of claim 10, wherein:
the proportional pressure limiting valve includes a return spring which urges the proportional pressure limiting valve into a blocking position.

13. The suspension system of claim 12, wherein:
tank pressure acts upon the proportional pressure control valve in a same direction as the force of the return spring, and rod chamber pressure acts upon the proportional pressure control valve in a same direction as an electromagnetic force.

14. The suspension system of claim 10, further comprising:
a first line extending between the solenoid valve and the proportional pressure limiting valve, and a pressure line connecting the first line to the pressure source.

15. The suspension system of claim 14, wherein:
the pressure line includes a flow restriction therein.

16. The suspension system of claim 14, wherein:
a second solenoid valve is arranged in the pressure line, the second solenoid valve having a closed position which prevents a fluid outflow from the pressure source.

17. The suspension system of claim 1, wherein:
the pressure source includes a load sensing pump with a control port, and a control line connects the control port to the first solenoid valve and to the proportional valve.

18. The suspension system of claim 17, wherein:
the control line is connected to the tank via a flow restriction.

19. The suspension system of claim 17, further comprising:
a shuffle valve has a first inlet connected to the control line, a second inlet connected to a piston chamber load sensing line and an outlet connected to the control port of the load sensing pump.

20. A hydro-pneumatic suspension system having at least one a hydraulic suspension cylinder, the cylinder having a piston chamber and a rod chamber each connected to at least one accumulator and valve systems for controlling communication between said chambers and a pressure source and a reservoir, characterized by:
a rod chamber valve system for controlling communication between the rod chamber and the pressure source and the reservoir, the rod chamber valve system comprising a solenoid valve, a proportional valve for adjusting the pressure in the rod chamber, and a pressure sensor for sensing the pressure in the rod chamber, the proportional valve being controlled as a function of a signal from said pressure sensor.

21. A hydro-pneumatic suspension system having at least one hydraulic suspension cylinder, the cylinder having a piston chamber and a rod chamber each connected to at least one accumulator and valve systems for controlling communication between said chambers and a pressure source and a reservoir, characterized by:
a rod chamber valve system for controlling communication between the rod chamber and the pressure source and the reservoir, the rod chamber valve system comprising a proportional valve connected to the pressure source and the reservoir, and solenoid valve connected between the proportional valve and the rod chamber, the proportional valve adjusting the pressure in the rod chamber as a function of sensed pressure in the rod chamber.

* * * * *